US012180117B2

(12) United States Patent
Boon et al.

(10) Patent No.: US 12,180,117 B2
(45) Date of Patent: Dec. 31, 2024

(54) MINERAL BINDER COMPOSITION FOR 3D PRINTING

(71) Applicant: SIKA TECHNOLOGY AG, Baar (CH)

(72) Inventors: Gary Boon, Dubai (AE); Maxime Liard, Zürich (CH); Didier Lootens, Küssnacht (CH); Lolita Hauguel, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 431 days.

(21) Appl. No.: 17/439,677

(22) PCT Filed: Mar. 13, 2020

(86) PCT No.: PCT/EP2020/056857
§ 371 (c)(1),
(2) Date: Sep. 15, 2021

(87) PCT Pub. No.: WO2020/187742
PCT Pub. Date: Sep. 24, 2020

(65) Prior Publication Data
US 2022/0162124 A1    May 26, 2022

(30) Foreign Application Priority Data

Mar. 15, 2019    (EP) .................... 19163222

(51) Int. Cl.
*C04B 28/06*    (2006.01)
*B28B 1/00*    (2006.01)
(Continued)

(52) U.S. Cl.
CPC ............ *C04B 28/065* (2013.01); *B28B 1/001* (2013.01); *B33Y 10/00* (2014.12); *B33Y 70/10* (2020.01);
(Continued)

(58) Field of Classification Search
CPC ..... C04B 28/065; C04B 14/28; C04B 22/148; C04B 24/2647; C04B 24/383;
(Continued)

(56) References Cited

U.S. PATENT DOCUMENTS

2007/0204765 A1    9/2007    Le Roy-Delage et al.
2013/0098271 A1*   4/2013    Eberwein ................ C04B 28/02
                                                                    106/806

FOREIGN PATENT DOCUMENTS

EP    3360854 A1 *   8/2018
EP    3 421 201 A1    1/2019
(Continued)

OTHER PUBLICATIONS

Certified human translation of para. 0022 of JP-2017065963-A (Year: 2017).*
(Continued)

*Primary Examiner* — Jennifer A Smith
*Assistant Examiner* — Jeffrey Eugene Barzach
(74) *Attorney, Agent, or Firm* — Oliff PLC

(57) ABSTRACT

A dry mineral binder composition includes cement and mineral fillers for the manufacture of molded parts by way of 3D printing. The binder composition additionally contains at least one aluminum sulfate-based accelerator, at least one polycarboxylate ether-based super-plasticizer and at least one rheology additive.

18 Claims, 2 Drawing Sheets

(51) Int. Cl.
*B33Y 10/00* (2015.01)
*B33Y 70/10* (2020.01)
*C04B 14/28* (2006.01)
*C04B 22/14* (2006.01)
*C04B 24/26* (2006.01)
*C04B 24/38* (2006.01)
*C04B 40/00* (2006.01)
*C04B 103/00* (2006.01)
*C04B 103/10* (2006.01)
*C04B 103/32* (2006.01)
*C04B 103/50* (2006.01)
*C04B 111/00* (2006.01)

(52) U.S. Cl.
CPC ............ *C04B 14/28* (2013.01); *C04B 22/148* (2013.01); *C04B 24/2647* (2013.01); *C04B 24/383* (2013.01); *C04B 40/0042* (2013.01); *C04B 2103/0079* (2013.01); *C04B 2103/10* (2013.01); *C04B 2103/32* (2013.01); *C04B 2103/50* (2013.01); *C04B 2111/00181* (2013.01)

(58) Field of Classification Search
CPC ........ C04B 40/0042; C04B 2103/0079; C04B 2103/10; C04B 2103/32; C04B 2103/50; C04B 2111/00181; C04B 40/0608; C04B 28/04; B28B 1/001; B33Y 10/00; B33Y 70/10; B33Y 80/00; B33Y 70/00; B28C 5/06; B28C 5/0875; B28C 5/1261
See application file for complete search history.

(56) References Cited

FOREIGN PATENT DOCUMENTS

| | | | | |
|---|---|---|---|---|
| FR | 3042494 | A1 | 4/2017 | |
| JP | 2011241095 | A * | 12/2011 | ............. C04B 14/02 |
| JP | 2012201532 | A * | 10/2012 | |
| JP | 2017065963 | A * | 4/2017 | |
| KR | 100971111 | B1 | 7/2010 | |
| KR | 101732895 | B1 * | 5/2017 | |
| RU | 2 404 146 | C1 | 11/2010 | |
| WO | 2006/072273 | A1 | 7/2006 | |
| WO | 2012/162292 | A2 | 11/2012 | |
| WO | 2013/131583 | A1 | 9/2013 | |
| WO | 2017/212044 | A1 | 12/2017 | |
| WO | 2019/030255 | A1 | 2/2019 | |

OTHER PUBLICATIONS

English machine translation of JP-2017065963-A (Year: 2017).*
English machine translation of KR-101732895-B1 (Year: 2017).*
English machine translation of JP-2012201532-A (Year: 2012).*
King, Hobart M. "Limestone." Geology.Com, geology.com/rocks/limestone.shtml. Accessed Aug. 6, 2024. (Year: 2009).*
English translation of JP-2011241095-A (Year: 2011).*
Certified translation of para. 0017 of JP-2017065963-A (Year: 2017).*
Le et al., "Mix design and fresh properties for high-performance printing concrete," Materials and Structures, 2012, vol. 45, pp. 1221-1232.
Sika, "PRODUKTDATENBLATT Sika®ViscoCrete®-225 P," Dec. 2017, pp. 1-3.
Sika, "PRODUKTDATENBLATT Sika®ViscoCrete®-3088 S," Feb. 2017, pp. 1-3.
May 28, 2020 International Search Report issued in International Patent Application No. PCT/EP2020/056857.
Sep. 16, 2021 International Preliminary Report on Patentability issued in International Patent Application No. PCT/EP2020/056857.

* cited by examiner

MINERAL BINDER COMPOSITION FOR 3D PRINTING

TECHNICAL FIELD

The invention relates to a mineral binder composition, to the use thereof for 3D printing of mouldings, and also to a process for the production of mouldings from the binder composition by means of 3D printing.

PRIOR ART

Structural concrete is usually cast into shuttering for shaping, and allowed to harden therein. Manufacture of the shuttering incurs costs for materials and requires time; shaping is subject to restrictions, and shuttering is often treated with shuttering oils that pollute the environment. The concrete typically requires a number of hours to achieve strength sufficient to permit removal of the shuttering. There is therefore an ongoing increase in the importance of construction with concrete by means of 3D printing, without shuttering.

The expression "3D printing", or "generative manufacturing process", "generative manufacture" or "free-form construction" is used here for processes in which a three-dimensional object, or a moulding, is produced by controlled three-dimensional deposition, application and/or solidification of material. The deposition, application and/or solidification of the material in particular takes place here with reference to a data model of the required object, and in particular layer-by-layer. The material is typically applied by a 3D printer. The generative manufacturing process produces each object from a plurality of layers. An object is manufactured by using a shapeless material which in particular is subjected to chemical and/or physical procedures (e.g. melting, polymerization, sintering, hardening).

3D printing of cementitious binder compositions, in particular of mortar or concrete, represents a particular challenge.

Typically, an aqueous cementitious binder composition is prepared for this purpose and conveyed to a movable printing head of a 3D printer. The computer-controlled printing head, movable in at least one direction in space, deposits the material in a prescribed quantity and at a prescribed speed, typically in layers, until the desired moulding has been completed.

Stringent requirements are placed upon the rheological properties of, and on development of strength in, the cementitious binder composition. In order to achieve an economic manufacturing speed, 3D printing requires good conveyability of the aqueous binder composition to the printing head. Because no shuttering is used, the material must have sufficient strength to retain the given shape after application from the printing head. The material must moreover develop strength rapidly in order that, before application of the next layers lying horizontally above the lower, supportive layers, the latter layers have sufficient strength to avoid deformation by the weight of the layers lying thereabove. Rapid development of strength is in particular important for mouldings intended to reach a height of 0.5 m, 1 m, 2 m, or more.

In order to ensure good bonding of the individual layers, it is moreover advantageous that the respectively uppermost layer has not yet hardened completely when the next layer lying thereabove is applied.

Cement achieves its strength through reaction with water in a chemical process known as cement hydration. This reaction is also termed setting of the cement. The period between mixing of the cement with water and achievement of sufficient strength for dimensional stability and loadbearing capability is typically in the region of a plurality of hours.

Mixtures in the form of concrete or of mortar which comprise very little water and which are therefore very stiff have already been used for 3D printing. Such mixtures can only be conveyed over very short distances and with use of high pumping pressure, and the resultant moulding often comprises defects, for example air inclusions, and/or is optically inhomogeneous and/or has poor bonding between the individual applied layers.

EP 3 421 201 describes a cementitious mixture for 3D printing. The mixture comprises a hydraulic binder, latently hydraulic additives, fillers, aggregates, other additives and water. The particle size of the aggregates must be below 1 mm, and the viscosity of the mixture is between 4 000 and 35 000 Pa·s. The mixing time of the mortar is very long, and printing speed is low, and printing height is small.

WO 2019030255 describes a process for 3D printing in which an aqueous mineral binder composition is conveyed by a pump to a continuous mixer and is mixed in the continuous mixer with an aqueous setting accelerator. The binder composition, now accelerated, is applied layer-by-layer by means of a printing head. The mixing of the accelerator into the binder composition by a continuous mixer, preferably mounted on the printing head, implies an additional step and greatly increases the costs for installation of the printer.

The processes used hitherto do not satisfactorily solve the problem. Manufacturing speed is low and/or printing height is small, or costs are high. The moulding often has optical defects and/or strength is insufficient.

There is therefore a need for cementitious compositions for 3D printing which overcome the abovementioned disadvantages to the greatest possible extent.

DESCRIPTION OF THE INVENTION

It is an object of the present invention to provide an improved mineral binder composition for 3D printing. The composition is in particular intended to permit efficient, easy, inexpensive and reliable application at maximal speed, with the highest possible quality of the applied layers in relation to strength development and optical uniformity.

Surprisingly, this object is achieved via a composition as described in Claim 1.

The dry mineral binder composition is easy to handle. It requires only mixing with water, and can be applied without difficulty by means of a 3D printer.

The dry mineral binder composition already comprises accelerator; there is no need for addition of accelerator at, or shortly before, the printing head.

The dry mineral binder composition is amenable to rapid mixing with water to give a homogeneous aqueous binder composition. Continuous mixing is therefore possible; this is advantageous for homogeneity of mixing and for high print quality. The applied layers have high stability, and rapidly achieve strength sufficient to avoid deformation when supporting further layers applied thereabove. This permits rapid printing, also in vertical direction.

Use of an aluminium-sulfate-based accelerator achieves rapid development of strength of the binder mixture after mixing with water.

Aluminium-sulfate-based accelerators are typically used for sprayed concrete. For this, an aqueous accelerator solution or suspension is added directly at the spray nozzle to an unaccelerated concrete mixture. The accelerated concrete is sprayed onto a wall and immediately stiffens.

Surprisingly, it is possible to use an aluminium-sulfate-based accelerator in the binder composition of the invention without causing immediate onset of stiffening of the mixture after mixing with water. The aqueous binder composition retains good usage properties for a period sufficient to permit problem-free application thereof by means of a 3D printer, and also sufficient to permit development of good bonding to a fresh layer subsequently applied thereabove.

Surprisingly, the setting behaviour of the aluminium-sulfate-accelerated mineral binder composition can be controlled in targeted fashion by using at least one polycarboxylate ether with appropriate content of carboxylic acid groups. It is thus possible, merely by varying the quantity of polycarboxylate ether, to adjust the setting behaviour of the binder composition as required by the prevailing conditions, for example ambient temperature, desired vertical printing speed and desired printing height.

The quantity of polycarboxylate ether in the binder composition for the printing of a moulding with large horizontal dimension and therefore relatively small vertical construction speed can therefore by way of example differ from that for a moulding with relatively small horizontal dimension and relatively high vertical construction speed, in order to ensure optimized development of strength for both applications. This is very advantageous because variation of a single component allows provision of a binder composition adapted for the prevailing production parameters.

Surprisingly, with the mineral binder composition of the invention it is possible to obtain high printing speed, printing heights above one metre, and also homogeneous and aesthetically pleasing crack-free mouldings.

Other aspects of the invention are provided by other independent claims. Particularly preferred embodiments of the invention are provided by the dependent claims.

Methods for Implementation of the Invention

The invention provides a dry mineral binder composition comprising cement and mineral fillers for the production of mouldings by means of 3D printing, characterized in that the binder composition also comprises at least one aluminium-sulfate-based accelerator and comprises at least one superplasticizer based on a polycarboxylate ether and comprises at least one rheology aid, where the polycarboxylate ether has, on the assumption that all carboxylic acid groups are present as free acid, per gram of dry polycarboxylate ether, at least 1 mmol, in particular at least 1.2 mmol, specifically at least 1.8 mmol, of carboxylic acid groups.

The expression "3D printing" or "free-form construction" in the present document means a shaping process using no shuttering. This process uses layer-by-layer application of a deformable material in a plurality of layers or of relatively small portions on top of one another and optionally also alongside one another, and thus produces three-dimensional articles. The construction procedure here is computer-controlled in accordance with prescribed quantities and shapes. Hardening of the material, which is deformable during application, gives a solid moulding. Application of the layers in 3D printing is typically not achieved by spraying of the material.

The expression "mineral binder" in the present document in particular means a binder which reacts in a hydration reaction in the presence of water to give solid hydrates or hydrate phases.

The expression "mineral binder composition" in the present document correspondingly means a composition comprising at least one mineral binder. The composition in particular comprises the binder, fillers and optionally one or more additives.

The expression "dry mineral binder composition" in the present document means a flowable mineral binder composition with moisture content below 0.5% by weight.

The expression "aqueous mineral binder composition" in the present document means a mineral binder composition which has been mixed with water and is in particular in fluid form.

The expression "polycarboxylate ether" in the present document means a comb polymer comprising a backbone made of hydrocarbons with carboxylic acid groups, or salts thereof, bonded thereto and with polyalkylene glycol side chains (=polyether side chains) likewise covalently bonded to the backbone. In particular, the side chains here are bonded by way of ester groups, ether groups, imide groups and/or amide groups to the polycarboxylate backbone.

The quantity of carboxylic acid groups in the polycarboxylate ether is stated in millimoles of carboxylic acid groups in one gram of the polycarboxylate ether (mmol/g). Any salts that may be present of the carboxylic acids here are counted with the carboxylic acid groups, and the weight used of the polycarboxylate ether is the weight in non-neutralized form.

Carboxylic esters are not counted here with the carboxylic acid groups, even if they are present in the latent form, i.e. even if they can be hydrolysed in an alkaline medium, e.g. at pH=12.

The quantity of carboxylic acid groups in the polycarboxylate ether can by way of example be determined by titration. Methods for the titration of carboxylic acid groups in a polymer are known per se to the person skilled in the art.

The quantity of carboxylic acid groups in the polycarboxylate ether can by way of example also be calculated.

In so far as polycarboxylate ethers produced by a polymer-analogous reaction of a polycarboxylate are used, the calculation is made in accordance with the following formula (I):

$$CS = \frac{\frac{M_n(BB)}{M(monomer)} - \frac{\frac{M_n(BB)}{M(monomer)}}{1 + \frac{\frac{m(BB)}{M(monomer)} - \sum_{a=1}^{\infty} n_a(SK)}{\sum_{a=1}^{\infty} n_a(SK)}}}{M_n(polymer)} * 1000 \qquad (I)$$

where

CS=the quantity of carboxylic acid groups in one gram of the polycarboxylate ether in mmol/g, $M_n(BB)$=average molar mass of the polycarboxylate backbone in g/mol, M(monomer)=average molar mass of the monomers of the polycarboxylate backbone in g/mol, m(BB)=input weight of the polycarboxylate backbone in g in production of the polycarboxylate ether, $n_a(SK)$=molar quantity of the a. side chain in mol in production of the polycarboxylate ether (corresponds to the quotient calculated from the input weight of the a. side chain in production of the polycarboxylate ether and the average molar mass of said side chain), $M_n(polymer)$=average molar mass of the polycarboxylate ether in g/mol.

The average molar mass of the polycarboxylate ether used is determined here in particular by means of GPC against PEG as standard.

A calculation example is presented below:

A polycarboxylate ether is produced by transesterification of a polymethacrylic acid of average molar mass 7000 g/mol with a methoxy-terminated polyethylene glycol of average molar mass 1000 g/mol. The input weight of the polyacrylic acid is 100 g, the input weight of the methoxy-terminated polyethylene glycol is 150 g. These data give:

$M_n(BB)=7000$ g/mol
M(monomer)=84 g/mol
m(BB)=100 g
$n_a(SK)=150/1000$ g/mol=0.15 g/mol The average molar mass of the resultant polymer is determined as 17 500 g/mol by means of GPC analysis. It follows from this that: $M_n$(polymer)=17 500 g/mol CS can be calculated from the above as follows:

$$CS = \frac{83.3 - \frac{83.3}{1 + \frac{1.19 - 0.15}{0.15}}}{17500} * 1000 = 4.16$$

In so far as polycarboxylate ethers produced by a free-radical polymerization from alkylenically unsaturated monomers are used, the calculation is made in accordance with the following formula (II):

$$CS = \frac{n_S}{\sum_{a=1}^{\infty} m(monomer_a)} * 1000 \quad (II)$$

where
CS=the quantity of carboxylic acid groups in one gram of the polycarboxylate ether in mmol/g,
$n_S$=molar quantity of the carboxylic acid groups in mol that are present in the monomers used for the production of the polycarboxylate ether,
$m(monomer_a)$=input weight of the a. monomer in g in the production of the polycarboxylate ether.

A calculation example is presented below:

A polycarboxylate ether is produced by free-radical polymerization of a mixture of 100 g of acrylic acid and 200 g of an ethoxylated allyl ether with an average molar mass of 2500 g/mol. These data give:
$n_S=100/72$ g/mol=1.39 g/mol,
$m(monomer_a)=100+200$ g=300 g.

CS can be calculated as follows from the above: 1.39/300*1000 mmol/g=4.63 mmol/g.

The expression "rheology aid" in the present document means a substance which can alter the rheological properties of the aqueous mineral binder composition; in particular, the substance increases viscosity, raises yield point and/or increases thixotropy.

The expression "dimensional stability" in the present document means a property of a material where, as long as no exterior force other than gravity acts on the moulded material, the individual dimensions of the material change by at most 10% after shaping.

The expression "sag resistance" in the present document means the strength that a hardenable material has after application before hardening.

Cement used can comprise any available cement type or a mixture of two or more cement types, for example the following cements classified under DIN EN 197-1: Portland cement (CEM I), Portland composite cement (CEM II), blast furnace slag cement (CEM III), pozzolanic cement (CEM IV) and composite cement (CEM V). Cements produced in accordance with an alternative standard, for example the ASTM standard, are, of course, equally suitable.

Preference is given to Portland cement CEM I or CEM II in accordance with DIN EN 197-1. Particular preference is given to Portland cement CEM I 42.5 or CEM I 52.5. These cements provide good strength and good usage properties. For production of white or coloured mouldings it is advantageous to use a white cement: CEM I or CEM II.

The dry mineral binder composition advantageously also comprises at least one latently hydraulic or pozzolanic binder, in particular metakaolin and/or silica fume (amorphous $SiO_2$). The quantity present of the latently hydraulic or pozzolanic binder is preferably 0.1 to 10% by weight, in particular 0.5 to 5% by weight, based on the total weight of the dry binder composition. These additions can improve the usage properties of the aqueous binder composition and increase the strength of the hardened binder composition.

The dry mineral composition comprises mineral fillers.

Fillers are chemically inert solid particulate materials, and are supplied in various forms and sizes, and in the form of various materials, extending from very fine sand particles to large, coarse rock fragments. All fillers that are usually used for concrete and mortar are in principle suitable. Examples of particularly suitable fillers are granulated rock, gravel, sand, in particular quartz sand, limestone sand and slag sand, comminuted rock, calcined shingle, or low-density fillers such as expanded clay, expanded glass, foamed glass, pumice, pearlite and vermiculite. Other advantageous fillers are fine or very fine fillers, for example ground limestone or dolomite, aluminium oxide, silica fume (amorphous $SiO_2$), powdered quartz, or ground steel slag, without or with only weakly latently hydraulic reactivity.

Preferred fillers are selected from the group consisting of quartz sand, powdered quartz, limestone sand, ground limestone and ground steel slag. The filler preferably comprises at least one finely ground crystalline filler, in particular limestone. This filler can promote early development of strength of the binder composition after mixing with water.

The particle size of the fillers depends on the application, and is in the range 0.1 μm to 32 mm and above. It is preferable that different particle sizes are mixed in order to optimize the properties of the binder composition. It is also possible to mix fillers made of different materials. Particle size can be determined by sieve analysis.

Particle sizes of fillers are preferably at most 8 mm, more preferably at most 5 mm, still more preferably at most 3.5 mm, most preferably at most 2.2 mm, in particular at most 1.2 mm or at most 1.0 mm.

The particle size is in particular determined via the planned layer thickness of the layers applied during 3D printing: it is advisable that the maximal particle size of the fillers is equal to the planned layer thickness during application.

It is preferable that the binder composition comprises 20 to 40% by weight, in particular 22 to 36% by weight, based on the total weight of the dry binder composition, of fine fillers with particle size below 0.125 mm.

Suitable fillers with small particle size are in particular fine quartz sands, powdered quartz, ground calcium carbonate or ground steel slag.

The binder composition preferably comprises 1 to 10% by weight, more preferably 2 to 5% by weight, of ground calcium carbonate with particle size below 0.01 mm. The very fine calcium carbonate improves the usage properties of the binder composition after mixing with water, and can increase development of strength of the binder composition.

Specific applications can also use fillers with particle sizes up to 32 mm, more preferably up to 20 mm, most preferably up to 16 mm.

Particle sizes can be determined by sieve analysis in accordance with the standards ASTM C136, and also ASTM C117.

The quantity present of the mineral fillers is preferably 45 to 85% by weight, in particular 50 to 80% by weight, based on the total weight of the dry binder composition.

The dry mineral binder composition comprises an aluminium-sulfate-based accelerator.

The accelerator brings about rapid development of strength of the binder composition after mixing with water.

The accelerator advantageously comprises at least 30% by weight, preferably at least 35% by weight, more preferably at least 40% by weight, of aluminium sulfate, calculated as aluminium sulfate hydrate $Al_2(SO_4)_3.16H_2O$.

The accelerator can advantageously also comprise, alongside the aluminium sulfate, other constituents such as amino alcohols, alkali metal nitrates and alkaline earth metal nitrates, alkali metal nitrites and alkaline earth metal nitrites, alkali metal thiocyanates and alkaline earth metal thiocyanates, alkali metal halides and alkaline earth metal halides, alkali metal carbonates, glycerol, glycerol derivatives, other aluminium salts, aluminium hydroxides, alkali earth metal hydroxides and alkaline earth metal hydroxides, alkali metal silicates and alkaline earth metal silicates, alkali metal oxides and alkaline earth metal oxides, or alkali metal formates and alkaline earth metal formates, or mixtures thereof.

In a specifically preferred binder composition, the accelerator consists of at least 90% by weight, in particular at least 95% by weight, of aluminium sulfate hydrate, or is aluminium sulfate hydrate.

The binder composition is preferably free from amino alcohols. Amino alcohols have a strong unpleasant odour and can be hazardous to health, and can lead to uncontrolled stiffening of the binder composition after mixing with water.

The quantity present of the aluminium-sulfate-based accelerator is preferably 0.1 to 2% by weight, more preferably 0.3 to 1.5% by weight, in particular 0.4 to 1.0% by weight, based on the total weight of the dry binder composition.

Addition of these quantities of the accelerator, in particular in combination with a polycarboxylate ether, leads to rapid development of strength of the binder composition after mixing with water, without impairment of usage properties for the printing procedure.

The dry mineral binder composition comprises at least one superplasticizer based on polycarboxylate ether. The at least one polycarboxylate ether comprises carboxylic acid groups in the form of free, i.e. non-neutralized, carboxylic acid groups and/or in the form of their alkali metal salts and/or their alkaline earth metal salts.

Preference is given to a polycarboxylate ether which has no other anionic groups alongside the carboxylic acid groups.

Preference is further given to a polycarboxylate ether whose side chains consist of at least 80 mol %, preferably at least 90 mol %, specifically preferably 100 mol %, of ethylene glycol units.

The average molar mass Mw of the side chains is preferably in the range 500 to 10 000 g/mol, preferably 800 to 8000 g/mol, specifically preferably 1000 to 5000 g/mol. It is also possible that side chains with different molecular weights are present in the polycarboxylate ether.

Preference is given to a polycarboxylate ether composed of methacrylic acid units and/or acrylic acid units and monomer units having polyalkylene glycol chains. It is preferable that the average molar mass Mw of the at least one polycarboxylate ether is 8000 to 200 000 g/mol, in particular 10 000 to 100 000 g/mol, against polyethylene glycol standards.

These polycarboxylate ethers provide good usage properties to the binder composition after it has been mixed with water, despite the presence of the aluminium-sulfate-based accelerator, and at low water content.

Low water content brings about high strength of a hardened moulding.

In combination with the aluminium-sulfate-based accelerator, these polycarboxylate ethers are particularly effective as means of controlling the onset of stiffening and/or of setting of the aqueous binder composition.

The at least one polycarboxylate ether can be introduced in the form of aqueous solution into the binder composition, for example by spraying onto the fillers before mixing with the mineral binder.

It is preferable that the at least one polycarboxylate ether is present in the form of powder in the dry binder composition.

In a preferred embodiment of the invention, the at least one polycarboxylate ether has a block structure or gradient structure. The expression "polycarboxylate ether with block structure or gradient structure" in the present document means a polymer in which the monomer units are present in non-random sequence, i.e. the sequence is controlled. At least one section in the polycarboxylate ether with block structure or gradient structure comprises monomer units comprising polyalkylene glycol side chains, and no, or very few, monomer units having carboxylic acid groups, and at least one section comprises monomer units have carboxylic acid groups and no, or very few, monomer units having polyalkylene glycol side chains. These block polymers or gradient polymers therefore have sections with high density of anionic groups and sections comprising no, or only a few, anionic groups.

Surprisingly, polycarboxylate ethers with block structure or gradient structure develop their plasticizing action very rapidly. They therefore have particularly good suitability for applications where binder composition is mixed with water for a very short time, in particular for continuous mixing.

Polycarboxylate ethers with block structure or gradient structure moreover provide low viscosity to the aqueous binder composition. This improves the pumpability of the binder composition after mixing with water. It is likewise surprising that the good plasticizing effect of the polycarboxylate ethers with block structure or gradient structure in the binder composition of the invention lasts only a few minutes; this is advantageous for 3D printing because it can achieve good usage properties of the binder composition directly after mixing with water and also good sag resistance of the aqueous binder composition after application.

The quantity present of the at least one polycarboxylate ether is preferably 0.02 to 5% by weight, more preferably 0.05 to 4% by weight, in particular 0.1 to 3% by weight, calculated as dry polymer, based on the total weight of the dry binder composition.

The metered addition of the at least one polycarboxylate ether in the binder composition is advantageously adjusted as required by the particular printing task: the printing parameters, for example typically the desired height of the moulding, the thickness of the applied layers, the printing speed and the expected ambient temperature, are advantageously determined before printing, and then the ideal quantity of polycarboxylate ether in the binder composition is advantageously determined by using values gained from experience, tables and/or a computer programme.

The quantity of polycarboxylate ether in the binder composition for the printing of a moulding with large horizontal dimension and therefore relatively small vertical construction speed can therefore by way of example differ from that for a moulding with relatively small horizontal dimension and relatively high vertical construction speed, in order to ensure optimized development of strength for both applications.

The total quantity of polycarboxylate ether is advantageously provided in the dry binder composition.

However, in particular for applications involving small quantities and/or if the printing parameters are variable, specifically because of temperature variations or waiting times, or if the moulding to be printed has different parts with different dimensions, it is also advantageously possible that only a portion of the polycarboxylate ether is present in the dry binder composition, and that another portion, respectively adjusted as required for the current printing conditions, is added during, or shortly after, mixing with water.

The other portion of the polycarboxylate ether is advantageously added together with the mixing water in a continuous mixing procedure.

It is thus possible to produce large quantities of the dry binder composition; this is advantageous, and the adjustment of the properties of the aqueous binder composition as required by the prevailing printing conditions takes place in simple and inexpensive manner only briefly before application.

The dry mineral binder composition comprises at least one organic and/or inorganic rheology aid.

Suitable rheology aids are in particular modified starches, amylopectin, modified cellulose, microbial polysaccharides, galactomannans, alginates, tragacanth, polydextrose, superabsorber or mineral thickeners.

The rheology aid is preferably selected from the group consisting of modified starches, modified celluloses, microbial polysaccharides, superabsorber and mineral thickeners.

The total quantity of rheology aid in the dry binder composition is preferably 0.01 to 5% by weight, based on the total weight of the dry binder composition.

The modified starch is preferably a starch ether, in particular hydroxypropyl starch, carboxymethyl starch or carboxymethylhydroxypropyl starch. The quantity present of the modified starch is preferably 0.01 to 2% by weight, based on the total weight of the dry binder composition.

The modified cellulose is preferably methylcellulose, ethylcellulose, carboxymethylcellulose, hydroxymethylcellulose, hydroxyethylcellulose or methylhydroxyethylcellulose, and the quantity present thereof is preferably 0.01 to 2% by weight, based on the total weight of the dry binder composition.

The microbial polysaccharide is preferably welan gum, xanthan gum or diutan gum, and the quantity present thereof is preferably 0.01 to 0.1% by weight, based on the total weight of the dry binder composition.

The superabsorber is preferably selected from the group comprising polyacrylamide, polyacrylonitrile, polyvinylalcohol, isobutylene-maleic anhydride copolymers, polyvinylpyrrolidone, homo- and copolymers of monoethylenically unsaturated carboxylic acids, for example (meth)acrylic acid, crotonic acid, sorbic acid, maleic acid, fumaric acid, itaconic acid, and preferably polyacrylic acid, where these can have been partially or completely neutralized, and co- and terpolymers of the monoethylenically unsaturated carboxylic acids mentioned with vinylsulfonic acid, (meth)acrylamidoalkylsulfonic acids, allylsulfonic acid, vinyltoluenesulfonic acid, vinylphosphonic acid, (meth)acrylamide, N-alkylated (meth)acrylamide, N-methylol(meth)acrylamide, N-vinylformamide, N-vinylacetamide, vinylpyrrolidone, hydroxyalkyl (meth)acrylate, ethyl acrylate, methyl acrylate, (meth)acrylates of polyethylene glycol monoallyl ethers, vinyl acetate and/or styrene.

The superabsorber homo- and copolymers can be linear or branched; the copolymers can be random or can be present in the form of block polymers or gradient polymers. It is preferable that the homo- and copolymers have additionally been crosslinked.

It is preferable that the superabsorber is polyacrylic acid, which to some extent or entirely can have been neutralized and has been crosslinked.

It is preferable that the quantity present of the superabsorber, if it is present, is 0.01 to 0.5% by weight, in particular 0.05 to 0.3% by weight, based on the total weight of the dry binder composition.

The mineral thickener is preferably a specific silicate or clay mineral, in particular a bentonite or sepiolite, preferably sepiolite.

The quantity present of the mineral thickener is preferably 0.1 to 1% by weight, based on the total weight of the dry binder composition.

The binder composition preferably comprises at least two, more preferably at least three, different rheology aids.

The rheology aid is particularly suitable for ensuring the dimensional stability of the aqueous binder composition, and for providing, to an applied layer, sufficient sag resistance for support of one or more other layers without substantial change of shape before onset of hydration of the cement.

Preferred combinations of two or more rheology aids are:
modified cellulose and microbial polysaccharide;
modified cellulose and superabsorber;
microbial polysaccharide and superabsorber;
microbial polysaccharide, superabsorber and mineral thickener;
modified cellulose, microbial polysaccharide and superabsorber;
modified cellulose, microbial polysaccharide, superabsorber and mineral thickener.

The combination of two or more rheology aids permits ideal balancing of the different thickening properties of the rheology aids. This provides good usage properties together with good sag resistance of the aqueous binder composition.

Specific preference is given to a combination of rheology aids which comprises at least one superabsorber.

The superabsorber additionally has the effect of reducing shrinkage; this is particularly advantageous.

The dry mineral binder composition preferably additionally comprises 0.1 to 5% by weight, preferably 0.1 to 4.5% by weight, more preferably 0.5 to 3% by weight, of calcium sulfoaluminate, based on the total weight of the dry binder composition. A suitable calcium sulfoaluminate is by way of example present in Denka CSA #20 obtainable from Newchem, Switzerland.

The calcium sulfoaluminate can, specifically when the preferred quantity is added, increase early development of strength of the aqueous binder composition and at the same time reduce shrinkage.

Higher content of calcium sulfoaluminate in the binder composition can reduce the final strength of a printed moulding, and increases costs for the composition.

Surprisingly, the shrinkage of the binder composition after application can be greatly reduced by the combination of calcium sulfoaluminate and rheology aid, in particular superabsorber. Shrinkage can lead to formation of cracks in the moulding produced. Cracks adversely affect appearance, and can reduce the life of the printed structures.

The dry mineral binder composition advantageously also comprises at least one other additive for reduction of shrinkage selected from the group consisting of glycols, polyglycols and water-storing materials, for example in particular porous rock fragments, ground brick and/or ground cement.

The dry mineral binder composition preferably also comprises at least one antifoam, in particular selected from the group consisting of oil-based antifoams, in particular mineral-oil-, vegetable-oil- or white-oil-based antifoams, which can comprise a wax and/or can comprise hydrophobic silica, silicone-based antifoams, which by way of example can have been modified by alkoxylation or fluorination, alkyl esters of phosphoric or phosphonic acid, alkoxylated polyols, in particular ethoxylated diols, fatty-acid-based antifoams, in particular mono- and diglycerides of fatty acids and alkoxylated fatty alcohols, and mixtures thereof.

The antifoam is preferably selected from the group comprising ethoxylated 2,4,7,9-tetramethyl-5-decyne-4,7-diol, a combination of fatty alcohol alkoxylates and polysiloxane and a combination of mineral oil and a silicone oil comprising hydrophobic silica.

The quantity preferably present of the antifoam is 0.01 to 1% by weight, in particular 0.1 to 0.8% by weight, based on the total weight of the dry binder composition.

Use of an antifoam is advantageous because it prevents or reduces formation of air pores during mixing of the dry binder composition with water. Air pores can adversely affect conveying of the aqueous binder composition to the printing head, and reduce strength in the hardened moulding, and pores adversely affect the appearance of the moulding.

Surprisingly, the antifoam additionally reduces shrinkage, and thus cracking, in the hardened moulding.

The dry mineral binder composition can also optionally comprise at least one other additive, for example a concrete admixture and/or a mortar admixture. The at least one other additive comprises in particular a flow agent, a retarder, a wetting agent, fibres, a dye, a preservative, another accelerator, a dispersion polymer, a cationic polymer, a cationic polycondensate, a cationic comb polymer, an air-pore former, another shrinkage reducer, or a corrosion inhibitor, or a combination thereof.

The flow agent is in particular sodium gluconate, lignosulfonate, sulfonated naphthalene-formaldehyde condensate, sulfonated melamine-formaldehyde condensate, sulfonated vinyl copolymer, polyalkylene glycol having phosphonate groups, polyalkylene glycol having phosphate groups, or an aromatic condensate having phosphonate groups and polyalkylene glycol chains.

Use of hardening retarders can be advantageous because it increases the usage time of the aqueous binder composition. The hardening retarder is preferably a hydroxycarboxylic acid, in particular tartaric acid, citric acid or gluconic acid, a sugar, in particular sucrose, a phosphate or a phosphonate, or salts of these or a mixture thereof.

A preferred binder composition comprises:
10 to 50% by weight, preferably 12 to 40% by weight, in particular 15 to 35% by weight, of cement, in particular Portland cement,
0.1 to 5% by weight, preferably 0.1 to 4.5% by weight, more preferably 0.5 to 3% by weight, of calcium sulfoaluminate,
0 to 10% by weight, preferably 0.1 to 5% by weight, of at least one latently hydraulic binder, in particular metakaolin and/or silica fume,
45 to 85% by weight, preferably 50 to 80% by weight, of mineral fillers,
0.1 to 2% by weight of an accelerator based on aluminium sulfate,
0.02 to 5% by weight of at least one polycarboxylate ether,
0.01 to 2% by weight of at least one rheology aid,
0.01 to 1% by weight of at least one antifoam and
0 to 10% by weight of other additives,
based on the total weight of the dry binder composition.

The invention further provides an aqueous mineral binder composition obtained by mixing of the dry mineral binder composition, as described above, with water, in particular with 10 to 25% by weight, preferably 12 to 22% by weight, more preferably 14 to 20% by weight, of water, based on the total weight of the dry binder composition.

The mixing with water preferably takes place in a continuous mixer.

High manufacturing speed is thus ensured. In the event of any possible interruption, furthermore, there is no requirement for disposal of material already mixed in non-continuous mixing equipment.

The initial setting time of the aqueous binder composition is advantageously between about 10 minutes and 1 hour and the final setting time is advantageously between about 30 minutes and 3 hours, measured in accordance with DIN EN 196-3 at 20° C. by an automatic Vicat apparatus.

The strength advantageously achieved by the aqueous binder composition at 20° C. one hour after application is at least 0.05 MPa, preferably at least 0.08 MPa, in particular at least 0.1 MPa, and 3 hours, preferably 2 hours, after application is at least 0.5 MPa, in particular 1 MPa. The strength can be determined by a penetration method, as described by way of example in ASTM C403.

This type of development of strength of the aqueous binder composition is particularly advantageous for efficient production of mouldings.

The invention also provides the use of the aqueous mineral binder composition for the production of mouldings by means of 3D printing.

The invention also provides a process for the application of a mineral binder composition, in particular by means of 3D printing, comprising the steps of:
provision of a dry mineral binder composition, as described above, of water, and optionally of at least one other additive;
addition, by a feed device, of the dry mineral binder composition, of water, and optionally of the at least one other additive into a mixing device, in particular into a mixing chamber of the mixing device;
mixing of the dry mineral binder composition with water and optionally with the at least one other additive in the mixing device to give an aqueous mineral binder composition;

with use of a conveying device, introduction of the aqueous mineral binder composition through a conveying line into a printing head that is movable in at least one direction in space;

application of the aqueous mineral binder composition by the movable printing head.

It is advantageous in this process that at least one other additive is added together with the water to the dry mineral binder composition, where the at least one other additive comprises another polycarboxylate either, a retarder and/or another rheology aid, in particular a polycarboxylate ether, and where the metered addition of the at least one other additive is adjusted as required by printing conditions, for example horizontal and vertical printing speed, printing height and ambient temperature.

It is preferable that the at least one other additive is a polycarboxylate ether, a retarder and/or a rheology aid as described above.

It is preferable that the other polycarboxylate ether is the same as the polycarboxylate ether in the dry mineral binder composition, but is present here in particular in the form of aqueous solution.

However, it can also be advantageous that the other polycarboxylate ether is not the same as the polycarboxylate ether in the dry mineral binder composition. In particular, the other polycarboxylate ether differs from the polycarboxylate ether in the dry mineral binder composition in the number of carboxylic acid groups per g of polymer and/or in the average molecular weight Mw of the polyalkylene glycol side chains, or has a block structure or gradient structure in the event that the polycarboxylate ether in the dry binder composition does not have a block structure or gradient structure.

It is preferable that the quantity of the other polycarboxylate ether added, if it is present, is 0.01 to 5% by weight, in particular 0.08 to 4% by weight, based on the weight of the aqueous binder composition.

It is preferable that the quantity of the retarder added, if it is present, is 0.01 to 3% by weight, in particular 0.03 to 2% by weight, based on the weight of the aqueous binder composition.

It is preferable that the quantity of the other rheology aid added, if it is present, is 0.01 to 2% by weight, based on the weight of the aqueous binder composition.

With this type of process it is possible to adjust the development of strength of the binder composition continuously as required by the printing procedure; this permits high-quality construction of the moulding despite possible temperature variations, unintended or intended changes of printing speed and/or interruptions of the printing procedure.

In another preferred embodiment of the present invention, during the printing procedure at least one property of the applied material is determined and if the property deviates from the prescribed set values the other additive, in particular a polycarboxylate ether, a retarder and/or a rheology aid, is metered into the mixing device.

In another embodiment of the present invention it is possible, in particular by means of a pump attached at, or shortly before, the printing head, to introduce into the aqueous binder composition at least one other rheology aid, in particular a modified cellulose and/or a microbial polysaccharide, preferably in the form of an aqueous solution.

It is thus possible to compensate unintended variations in the sag resistance of the aqueous binder composition.

With the process of the invention it is possible, through layer-by-layer application, to achieve homogeneous and rapid production of mouldings.

The printing speed, i.e. the speed of the horizontal motion of the printing head, is preferably at least 20 mm per second, more preferably at least 30 mm per second, in particular at least 40 mm per second.

In particular for rapid printing and rapid manufacture of the moulding, it can also be advantageous that the printing speed is higher, in particular more than 50 mm per second, 100 mm per second, 150 mm per second, or 200 mm per second, up to 500 mm per second.

The vertical printing speed depends on the horizontal dimension of the moulding, on the thickness of the individual applied layers and on the horizontal printing speed. It is preferable that the period between application of the lower layer and of the next layer lying thereabove is between about 1 second and 30 minutes, in particular between 10 seconds and 10 minutes.

The present invention also provides a moulding produced by mixing of a dry mineral binder composition, as described above, with water and optionally with other additives, layer-by-layer application of the aqueous mineral binder composition by a 3D printer and hardening of the binder composition.

The height of an individual layer, typically measured in a direction in essence perpendicular to the planes formed by individual layers, in particular in vertical direction, is preferably 0.2 mm to 200 mm, more preferably 1 mm to 100 mm, in particular 2 mm to 50 mm.

The total height of the moulding or the total thickness of all individual layers of the moulding is preferably 0.01 m to 100 m or more, more preferably 0.1 m to 80 m, still more preferably 0.3 m to 30 m, in particular 0.5 m to 10 m.

The height of the moulding is preferably at least 0.5 m, more preferably at least 1 m, specifically at least 1.5 m or 2 m.

While the surface of the moulding is still workable, suitable implements can be used for smoothing or finishing thereof, or achieving specific changes of its shape. These procedures can be carried out by the manufacturing machinery, or manually as a separate step. A functional or decorative coating, for example a paint, can also be provided to the surface.

While the moulding remains workable, it can also be cut by suitable implements. It is therefore possible to introduce holes into the moulding, in particular for window apertures, door apertures, or passageways, or else cuts, in particular for subsequent operations.

The moulding produced by the process of the invention can have almost any desired shape. The moulding is by way of example a built structure, a finished part for a built structure, a component, a masonry structure, a bridge, a column, a decorative element, examples being artificial hills, reefs, or sculptures, a pond, a fountain or a trough. The moulding here can be solid or hollow, with or without base.

The moulding can be produced directly on site, without further movement after application. However, the moulding can also be produced at a different site, in particular in a factory. This is preferably achieved on a substrate on which the moulding does not adhere. The moulding can be transported to the desired site after hardening.

Details and advantages of the invention are described below by taking working examples and with reference to diagrams.

WORKING EXAMPLES

Figure 1:
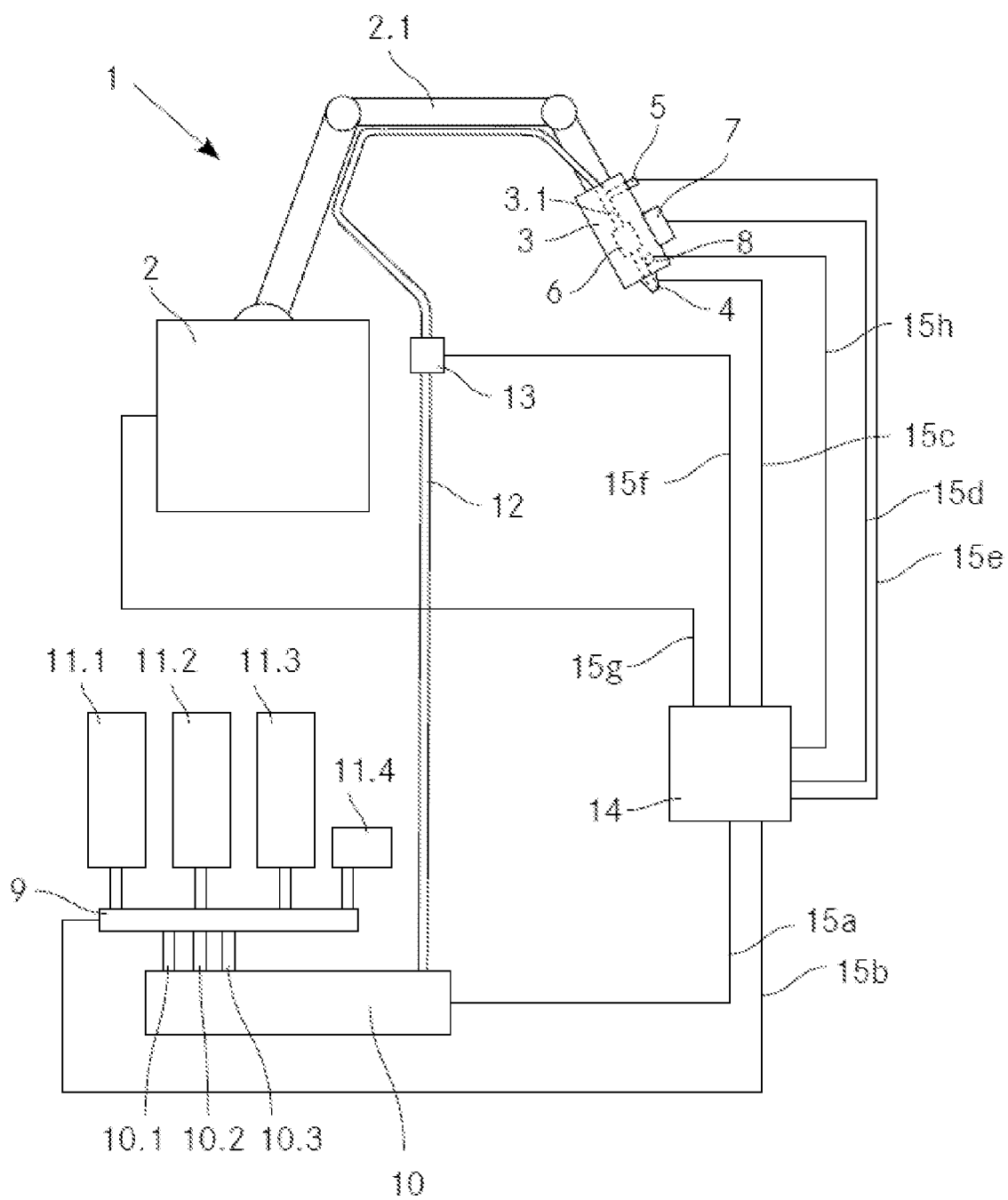
FIG. 1 is: a diagram of an example of a system for the application of an aqueous mineral binder composition.

FIG. 1 is a diagram of an example of a system 1 for carrying out a process of the present invention for the application of the aqueous mineral binder composition.

The system 1 comprises a moving device 2 with a movable arm 2.1. At the free end of the arm 2.1 there is a printing head 3 attached, which is movable in all three dimensions in space by the arm 2.1. The printing head 3 can thus be moved to any desired position in the operating range of the moving device 2.

In the interior of the printing head 3, running from the end (in FIG. 1 above) facing towards the arm 2.1 to the opposite, free end, there is a tubular passage 3.1 through which an aqueous mineral binder composition is to be conducted. At the free end, the passage 3.1 leads into a controllable outlet 4 in the form of a nozzle, which can be continuously opened and closed.

An inlet nozzle 5 for the addition of an additive leads laterally into the passage 3.1 in a region facing towards the arm 2.1. An additive, for example a rheology aid, can be added if necessary through the inlet nozzle 5 into the aqueous mineral binder composition moving through the passage 3.1.

In the interior of the printing head 3, downstream of the inlet nozzle, there is moreover, arranged in the passage 3.1, a static mixer 6 which additionally mixes the aqueous mineral binder composition and the additive during flow through the system.

In the region of the controllable outlet 4, there is moreover a measurement unit 8 arranged to determine the pressure in the tubular passage 3.1. The sampling frequency of the measurement unit 8 is by way of example 10 Hz.

Attached at the printing head 3 there is moreover a device 7 for removing air from the aqueous mineral binder composition. The device is designed as vacuum-treatment device, and can reduce the proportion of air in the aqueous mineral binder composition. To this end it is possible by way of example, to design a section of the wall of the passage 3.1 as gas-permeable membrane, so that air can be extracted from the aqueous mineral binder composition by applying a reduced pressure outside of the passage 3.1.

The system 1 for the application of an aqueous mineral binder composition moreover has a feed device 9 which has connections on its ingoing side to three containers 11.1, 11.2, 11.3, and to a reservoir 11.4. In each of the three containers 11.1, 11.2, 11.3 there is a respective component of the aqueous mineral binder composition. The first component, present in the first container 11.1, is a dry mineral binder composition. The second component, present in the second container 11.2, consists by way of example of water. The third component present in the third container 11.3 is by way of example a flow agent in the form of a polycarboxylate ether. In material present in the reservoir 11.4 is by way of example a rheology aid in the form of modified cellulose and/or of a microbial polysaccharide.

The outgoing side of the feed device 9 has three separate outlets, connected to a mixing device 10 by respectively one of three inlets 10.1, 10.2, 10.3. The feed device 9 moreover has individually controllable metering devices (not shown in FIG. 1), so that the individual components in the individual containers 11.1, 11.2, 11.3 can be metered individually into the mixing device 10.

Another outlet of the feed device is connected (not depicted in FIG. 1) to the inlet nozzle 5, so that additive from the reservoir 11.4 can be conveyed into the inlet nozzle 5 by way another metering device of the feed device 9.

The mixing device 10 is configured as dynamic mixer and comprises, together therewith, an integrated conveying device in the form of a screw conveyor. In the mixing device, the components individually metered into this device are mixed with one another and conveyed into the flexible line 12 attached to the outgoing side of the mixing device. During operation, the mixing and conveying of the binder composition can take place continuously.

The aqueous mineral binder composition can be conveyed into the printing head 3 through the flexible line 12, which concomitantly leads into the tubular passage 3.1 at that end of the printing head that faces towards the arm 2.1, and can be applied continuously through the controllable outlet 4.

Another constituent of the system 1 is a measurement unit 13, integrated into the conveying line 12 in the region between the mixing device 10 and the printing head 3. The measurement unit comprises by way of example an ultrasound transducer which is configured to determine the flow properties of the aqueous mineral binder composition. The sampling frequency of the measurement unit 13 is by way of example 10 Hz.

A central control unit 14 of the system 1 comprises a processor, a memory unit, and also a plurality of interfaces for the reception of data and a plurality of interfaces for the control of individual components of the system 1.

The mixing device 10 here is connected by way of a first control line 15a to the control unit 14, while the feed device is connected by way of a second control line 15b to the control unit 14. It is therefore possible, formulations appropriately prescribed by way of the central control unit and stored in the control unit, to meter the individual components in the containers 11.1, 11.2, 11.3 into the mixing device 10, and to convey these at adjustable conveying rates into the flexible line 12.

The controllable outlet 4, the inlet nozzle 5, and also the device 7 for removing air from the aqueous mineral binder composition at the printing head are respectively likewise connected by way of a separate control line 15c, 15d, 15e to the control unit 14 and can be controlled thereby.

The moving device 2 is also connected by way of another control line 15g to the control unit 14. The motion of the printing head 3 can therefore be controlled by way of the control unit 14.

The measurement unit 8 is connected by a data line 15h to the control unit 14, so that printing data captured in the measurement unit can be transmitted to the control unit 14.

Analogously, the measurement unit 13 is connected by a data line 15f to the control unit 14, so that data characterizing flow properties and captured in the measurement unit can be transmitted to the control unit 14.

The programming of the control unit 14 here is such that:
(i) the addition rates of the three components of the aqueous mineral binder composition are controlled by the feed device 9 as a function of the flow properties, determined by way of the measurement unit 13, of the aqueous mineral binder composition in the flexible line;
(ii) the conveying device integrated in the mixing device 10 is controlled as a function of the pressure 8 determined by way of the measurement unit 8, and also as a function of the structure of the object to be produced with the aqueous mineral binder composition;

(iii) the addition rate of the additive through the inlet nozzle 5 is controlled as a function of the flow properties of the aqueous mineral binder composition determined by way of the measurement unit 13, and also as a function of the structure of the object to be produced;

(iv) the extent of removal of air from the hardenable construction material in the device 7 is controlled as a function of the flow properties of the aqueous mineral binder composition determined by way of the measurement unit 13;

(v) the moving device 2, and therefore the position of the printing head 3, is controlled as a function of a model of the object to be produced, stored in the data memory of the control unit 14.

Inventive Example 1

The composition of the dry mineral binder composition of the invention is described in Table 1.

TABLE 1

| Component | % by weight in binder composition |
|---|---|
| CEM I 52.5 cement | 25 |
| Metakaolin | 4.5 |
| Betoflow ® D | 5 |
| Nekafill ® 15 | 20 |
| 0-1 mm quartz sand | 42 |
| Denka CSA #20 | 2 |
| Sika ® ViscoCrete ®-225P | 0.25 |
| Carbowet ® 4000 | 0.5 |
| Modified cellulose | 0.05 |
| Inorganic thickener | 0.1 |
| Superabsorber | 0.1 |
| Aluminium sulfate | 0.5 |

Materials Used

Aluminium sulfate is $Al_2(SO_4)_3 \cdot 18\ H_2O$, obtainable from Merck, Switzerland Betoflow® D is a fine calcium carbonate powder of particle size about 1-5 μm, obtainable from Omya.

Nekafill® 15 is a ground limestone obtainable from Kalkfabrik Netstal.

Sika® ViscoCrete-225P is a pulverulent superplasticizer based on a polycarboxylate ether, obtainable from Sika.

Carbowet® 4000 is an antifoam obtainable from Air Products Chemicals Europe.

Denka CSA #20 is a shrinkage reducer based on calciumsulfoaluminate cement, obtainable from Newchem, Switzerland.

3D printing was carried out by a system as depicted by way of example in FIG. 1.

The dry binder composition, with the composition stated in Table 1, was mixed continuously in the mixing device with a quantity of water such that the resultant ratio by weight of water to dry binder composition was about 0.16. The aqueous mineral binder mixture was then conveyed through the flexible conveying line by the screw conveyor integrated in the mixing device to the printing head of the 3D printer.

Conveying of the dry binder composition, addition of the water, mixing with the water, conveying of the aqueous binder composition, and the motion of the printing head were controlled by way of a control unit.

The temperature of the mixing water and of the ambient air was about 25° C.

The printing head was used to apply the binder composition in layers of about 30 mm width and 10 mm height onto a plastics film spread on a concrete base. The horizontal speed of the printing head here was about 40 mm per second. A tube with about 0.6 m diameter and height 2 metres was produced in a plurality of layers located vertically on top of one another. The time required to finish the moulding was about 2 hours and 40 minutes. The difference in heights between the lower layers and the upper layers was not more than 5%. The printed moulding had a very uniform undulating surface with no visible defects. The moulding also exhibited no visible cracks after 3 days of storage at 25° C. and about 40% relative humidity.

About 16 hours after application of the final layer, the hollow body was lifted, with the aid of carrying straps and a crane, onto a transport pallet; this did not result in any damage to the printed moulding.

After about four days, a heavy hammer was used to break the moulding into fragments, and these were optically analysed. The fracture surfaces were uniform, with no air inclusions or defects. The fracture surfaces exhibited no preferred orientation, and therefore bonding between the applied layers was as good as that within the layer.

The strength of the mortar was determined by producing prisms measuring 40×40×160 mm and testing these in accordance with DIN EN 196-1. The compressive strength of the mortar after 28 days of storage at 20° C. and 95% relative humidity was 50.2 MPa; flexural tensile strength was 8 MPa.

Inventive Example 2

Experiments for Inventive Example 2 were carried out as described in Inventive Example 1.

However, the quantity of Denka CSA #20 in the formulation of Table 1 was in each case adjusted as in Table 2. Start of setting and end of setting were determined in accordance with DIN EN 196-3. The linear volume decrease was moreover determined within 16 h after mixing with water by a method based on EN 12617-4. Table 2 below gives an overview of the results.

TABLE 2

Formulations and results of Inventive Example 2

| | 1E2-1 | 1E2-2 | 1E2-3 | 1E2-4 |
|---|---|---|---|---|
| Denka CSA #20*[1] | 0 | 2 | 4 | 8 |
| Start of setting [min] | 5.2 | 2.0 | 1.5 | 1 |
| End of setting [min] | 10.9 | 2.7 | 1.9 | 1.2 |
| Linear volume decrease [μm/m] | 2986 | 1204 | 736 | 324 |

*[1]% by weight in the binder composition of Table 1

Comparative Example 1

Inventive Example 1 was repeated with retention of the printing parameters, but the binder composition comprised no aluminium sulfate. The structure collapsed before a printing height of 0.3 m had been achieved.

Comparative Example 2

A fresh mortar made of 120 kg of cement CEM I 52.5, 92 kg of quartz sand measuring 0-1 mm, 33 kg of Betoflow®-D, 80 kg of Nekafill® 15, 0.6 kg of Sika® ViscoCrete®-

225P, 0.004 kg of Carbowet® 4000, 0.3 kg of superabsorber and 56.8 kg of water was prepared in a mechanical mixer.

Application by means of 3D printer was achieved as described in Inventive Example 1.

The mortar flowed out from the discharge nozzle, and could not be applied in layers. The experiment was then terminated.

Figure 2:
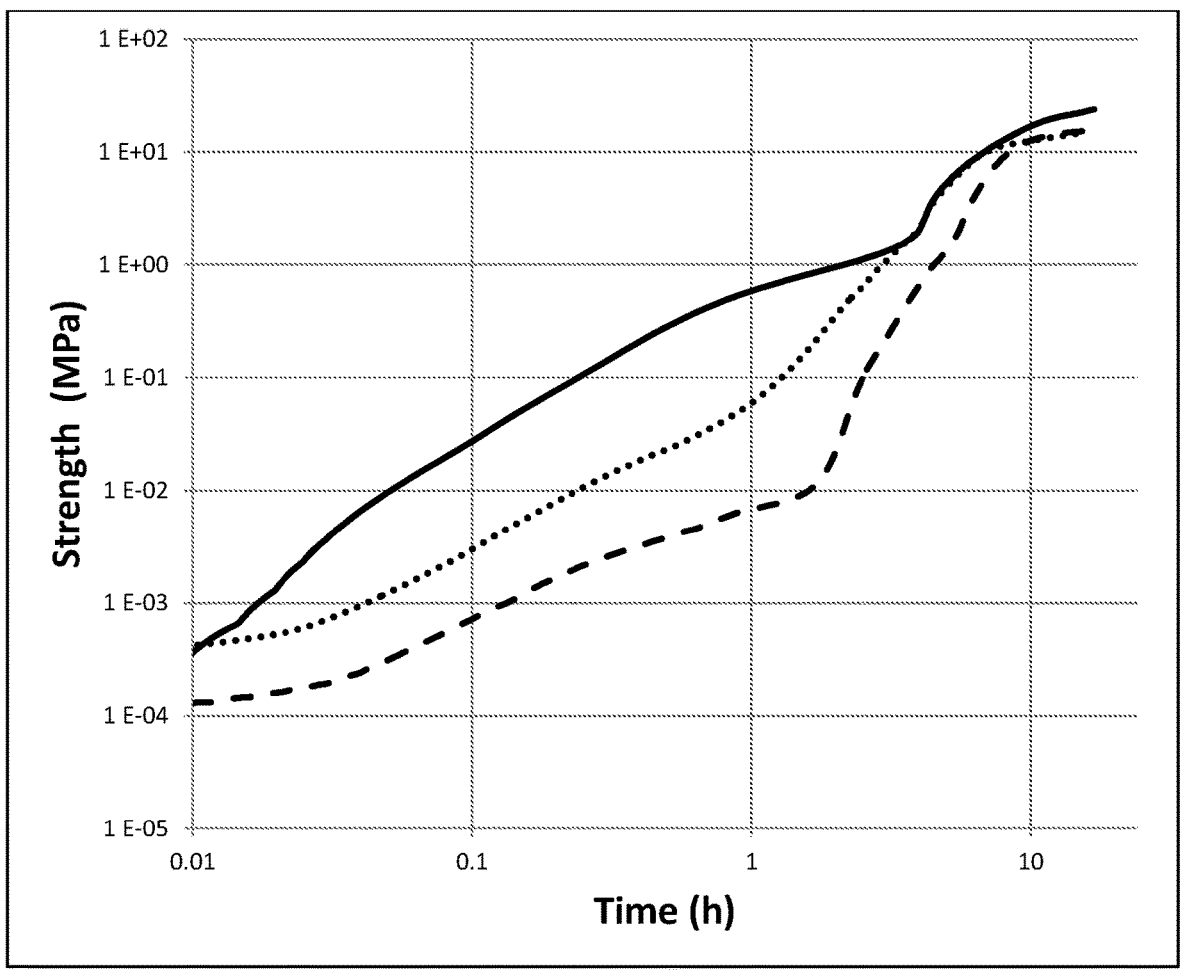
FIG. 2 is: a graph of chronological development of strength of aqueous cementitious binder compositions.

FIG. 2 is a graph of chronological development of strength of mortars over a number of hours beginning immediately after mixing with water:
- continuous line: typical development of strength of a mortar as described in Inventive Example 1;
- dotted line: typical development of strength of a mortar as is described in Comparative Example 1;
- dashed line: typical development of strength of a mortar as is described in Comparative Example 2.

The embodiments described above are merely illustrative examples, which can be modified as desired for the purposes of the invention.

It is therefore possible by way of example to omit the static mixer 6, with the result that the printing head comprises neither a static mixer nor a dynamic mixer.

In addition to, or instead of, the conveying device integrated in the mixing device 10, there can be one or more conveying devices provided in the conveying line 12 and/or in the printing head 3. These can also be conveying devices other than conveying screws.

It is likewise possible to provide, in the region of the printing head 3 and/or in the conveying line 12, instead of or in addition to the measurement unit 8, 13, other measurement units which by way of example permit measurement of temperature. It is also conceivable that the measurement unit 13 in the conveying line is omitted entirely or is integrated in the printing head.

The mixing device 10 can also have fewer or more inlets, thus permitting metered addition of additional components present in additional containers.

Instead of one or more of the containers 11.1, 11.2, 11.3, there can also be connections present to external sources, e.g. to a water supply.

It is also possible to programme the control unit in a different manner, for example in order to take into account a volume flow rate through the conveying line 12 and/or the printing head 3.

LIST OF REFERENCE SIGNS

1 System
2 Movement device
2.1 Movable arm
3 Printing head
3.1 Passage
4 Controllable outlet
5 Inlet nozzle
6 Static mixer
7 Air-removal device
8 Pressure-measurement unit
9 Feed device
10 Mixing device
10.1 First inlet
10.2 Second inlet
10.3 Third inlet
11.1 First container
11.2 Second container
11.3 Third container
11.4 Reservoir
12 Flexible line
13 Measurement unit with ultrasound transducer
14 Control unit
15a . . . h Control lines and data lines

The invention claimed is:

1. A dry mineral binder composition for the production of mouldings by means of 3D printing, the binder composition comprising:
(i) cement;
(ii) mineral fillers, including 1 to 10% by weight of ground calcium carbonate having a particle size below 0.01 mm,
(iii) at least one aluminium-sulfate-based accelerator,
(iv) at least one superplasticizer based on a polycarboxylate ether, where the polycarboxylate ether has, per gram of dry polycarboxylate ether, at least 1 mmol of carboxylic acid groups,
(v) at least one rheology aid, and
(vi) 0.1 to 5% by weight of calcium sulfoaluminate,
wherein the weight percentages are based on the total weight of the binder composition, wherein the mineral fillers include 20 to 40% by weight, based on the total weight of the binder composition, of fine fillers with a particle size below 0.125 mm.

2. The binder composition according to claim 1, wherein the binder composition includes from 0.1 to 2% by weight of the aluminium-sulfate-based accelerator, based on the total weight of the binder composition.

3. The binder composition according to claim 1, wherein the binder composition includes from 0.02 to 5% by weight of the polycarboxylate ether, calculated as dry polymer based on the total weight of the binder composition.

4. The binder composition according to claim 1, wherein the rheology aid is selected from the group consisting of modified starches, modified celluloses, microbial polysaccharides, superabsorber and mineral thickeners.

5. The binder composition according to claim 1, wherein the binder composition includes at least two different rheology aids.

6. The binder composition according to claim 1, wherein the binder composition also comprises at least one antifoam selected from the group consisting of oil-based antifoams, silicone-based antifoams, alkyl esters of phosphoric or of phosphonic acid, alkoxylated polyols, fatty-acid-based antifoams, alkoxylated fatty alcohols and mixtures thereof.

7. The binder composition according to claim 1 comprising:
10 to 50% by weight of the cement,
0.1 to 4.5% by weight of the calcium sulfoaluminate,
0 to 10% by weight of at least one latently hydraulic binder,
45 to 85% by weight of the mineral fillers,
0.1 to 2% by weight of the aluminium-sulfate-based accelerator,
0.02 to 5% by weight of the superplasticizer,
0.01 to 2% by weight of the at least one rheology aid,
0.01 to 1% by weight of at least one antifoam, and
0 to 10% by weight of other additives,
based on the total weight of the dry binder composition.

8. An aqueous mineral binder composition obtained by mixing of the dry mineral binder composition according to claim 1 with water, where the mixing takes place in a continuous mixer.

9. A method comprising producing mouldings by means of 3D printing with the aqueous mineral binder composition according to claim 8.

10. A process for the application of a mineral binder composition, comprising the steps of:
- provision of a dry mineral binder composition according to claim 1, of water, and optionally of at least one other additive;
- addition, by a feed device, of the dry mineral binder composition, of the water, and optionally of the at least one other additive into a mixing device;
- mixing of the dry mineral binder composition with the water and optionally with the at least one other additive in the mixing device to give an aqueous mineral binder composition;
- with use of a conveying device, introduction of the aqueous mineral binder composition through a conveying line into a printing head that is movable in at least one direction in space;
- application of the aqueous mineral binder composition by the movable printing head.

11. A process according to claim 10, wherein
- at least one other additive is added together with the water to the dry mineral binder composition, where the at least one other additive comprises another polycarboxylate ether, a retarder and/or another rheology aid, and
- where the metered addition of the at least one other additive is adjusted as required by printing conditions.

12. The process according to claim 10, wherein the speed of the horizontal motion of the printing head during the application of the aqueous mineral binder composition is at least 20 mm per second.

13. A moulding produced by mixing of a dry mineral binder composition according to claim 1 with water and optionally with other additives, layer-by-layer application of the aqueous mineral binder composition by a 3D printer and hardening of the binder composition.

14. The moulding according to claim 13, wherein its height is at least 0.5 m, where the height is obtained from the sum of all thicknesses of the layers applied in vertical direction.

15. The binder composition according to claim 1, wherein the mineral fillers include 2 to 5% by weight, based on the total weight of the binder composition, of the ground calcium carbonate having a particle size below 0.01 mm.

16. The binder composition according to claim 1, wherein the mineral fillers include 22 to 36% by weight, based on the total weight of the binder composition, of fine fillers with a particle size below 0.125 mm.

17. The binder composition according to claim 1, further comprising a latent hydraulic binder or pozzolanic binder that is selected from at least one of the group consisting of metakaolin and silica fume.

18. The binder composition according to claim 1, wherein the binder composition includes a superabsorber polymer.

* * * * *